(12) United States Patent
Alivisatos et al.

(10) Patent No.: US 8,435,635 B2
(45) Date of Patent: May 7, 2013

(54) CHEMICAL MODIFICATION OF NANOCRYSTAL SURFACES

(75) Inventors: A. Paul Alivisatos, Berkeley, CA (US); Jonathan Owen, New York, NY (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 13/056,592

(22) PCT Filed: Jul. 27, 2009

(86) PCT No.: PCT/US2009/051809
§ 371 (c)(1),
(2), (4) Date: Apr. 8, 2011

(87) PCT Pub. No.: WO2010/014526
PCT Pub. Date: Feb. 4, 2010

(65) Prior Publication Data
US 2011/0177340 A1     Jul. 21, 2011

Related U.S. Application Data

(60) Provisional application No. 61/084,852, filed on Jul. 30, 2008.

(51) Int. Cl.
*B32B 5/16* (2006.01)

(52) U.S. Cl.
USPC .......... 428/403; 428/404; 428/405; 428/406; 428/407; 427/212

(58) Field of Classification Search .......... 428/403–407; 427/212
See application file for complete search history.

(56) References Cited

U.S. PATENT DOCUMENTS

| | | | |
|---|---|---|---|
| 6,444,143 B2 * | 9/2002 | Bawendi et al. | 252/301.6 S |
| 2006/0240227 A1 * | 10/2006 | Zhang et al. | 428/195.1 |
| 2007/0116638 A1 * | 5/2007 | Petruska et al. | 423/509 |

OTHER PUBLICATIONS

Chemistry of Materials, vol. 19, pp. 1821-1831, Apr. 3, 2007.*
De Palma, Randy, et al. "Silane Ligang Exchange . . . " Chemistry of Materials, vol. 19, pp. 1821-1831, Apr. 3, 2007.*
International Search Report and Written Opinion of the International Searching Authority of Feb. 18, 2010 in related International Application PCT/US2009/051809.
De Palma, Randy, et al., "Silane Ligand Exchange to Make Hydrophobic Superparamagnetic Nanoparticles Water-Dispersable," *Chemistry of Materials*, vol. 19, pp. 1821-1831 (Apr. 3, 2007).

* cited by examiner

*Primary Examiner* — Leszek Kiliman
(74) *Attorney, Agent, or Firm* — Kilpatrick Townsend & Stockton LLP

(57) ABSTRACT

A method is disclosed. The method includes obtaining a precursor nanoparticle comprising a base material and a first ligand attached to the base material, and reacting the precursor nanoparticle with a reactant comprising a silicon bond, thereby removing the first ligand.

23 Claims, 4 Drawing Sheets

Scheme 2

Scheme 3

R = $C_{18}H_{37}$
R' = $C_{13}H_{27}$

… (omitting the US 8,435,635 B2 running header)

CHEMICAL MODIFICATION OF NANOCRYSTAL SURFACES

CROSS-REFERENCES TO RELATED APPLICATIONS

This application is a non-provisional of and claims the benefit of the filing date of U.S. Provisional Patent Application No. 61/084,852, entitled "Chemical Modification of Nanocrystal Surfaces," filed on Jul. 30, 2008, which is herein incorporated by reference in its entirety for all purposes.

STATEMENT AS TO RIGHTS TO INVENTIONS MADE UNDER FEDERALLY SPONSORED RESEARCH OR DEVELOPMENT

This invention was made with government support under Contract No. DE-AC02-05CH11231 awarded by the U.S. Department of Energy. The government has certain rights in the invention.

BACKGROUND OF THE INVENTION

It remains a major challenge to directly determine nanoparticle surface structures, because of the lack of analytical tools that are currently available. (Alivisatos, A. P., *J. Phys. Chem.*, 100:13226-13239 (1996)). Early nuclear magnetic resonance (NMR) and X-ray photoelectron spectroscopy (XPS) studies of CdSe nanocrystals prepared in coordinating solvents such as tri-n-octylphosphine oxide and tri-n-octylphosphine, suggested these coordinating solvents are datively bound to the surface of a nanoparticle. (Bowen-Katari, J. E. et al., *J. Phys. Chem.*, 98:4109 (1994); Becerra, L. R. et al., *J. Chem. Phys.*, 100:3297-3300 (1994)). However, assigning the broad NMR resonances of surface-bound ligands is complicated by significant concentrations of phosphorus-containing impurities in commercial sources of tri-n-octylphosphine oxide (1), and XPS provides only limited information about the nature of the phosphorus containing molecules in the sample.

More recent reports have shown that the surface ligands of CdSe nanocrystals prepared in technical grade tri-n-octylphosphine oxide, and in the presence of alkylphosphonic acids, include phosphonic and phosphinic acids. (Kopping, J. T.; Patten, T. E. J., *Am. Chem. Soc.*, 130:5689-5698 (2008); Wang, W.; *Chem. Mater,* 19:2573-2580 (2007)). These studies do not, however, determine if these ligands are bound datively, as neutral, L-type ligands, or by an X-type interaction of an anionic phosphonate/phosphinate moiety with a surface $Cd^{2+}$ ion. (Puzder, A., et al., *Nano Lett.*, 4:2361-2365 (2004); Manna, L. et al., *J. Phys. Chem. B*, 109:6183-6192 (2005)). Answering this question would help to clarify why ligand exchange with such particles does not proceed generally as expected based on an L-type ligand model. (Kuno, M. et al., *J. Chem. Phys.*, 106:9869-9882 (1997); Reiss, P. et al., *Nano Lett.*, 2:781-784 (2002); Wang, Y. A. et al., *J. Am. Chem. Soc.*, 124:2293-2298 (2002)).

In general, chemical modification of nanocrystal surfaces using ligand exchange processes is desirable. For example, nanocrystals with modified surfaces can be used in biology and medicine. Also, modifying the surfaces of nanocrystals can change the electrical and optical properties of such nanocrystals.

Surface modification of nanocrystals using (—SH) is known. While effective in some instances, it would be desirable to provide for other types of ligand reactions, which may be used to produce different types of nanocrystals. Nanocrystals with different types of ligands could be advantageously used in various applications (e.g., electronics).

These and other problems are addressed individually and collectively by embodiments of the invention.

SUMMARY OF THE INVENTION

Embodiments of the invention relate to nanoparticles, methods for making nanoparticles, and devices incorporating nanoparticles.

One embodiment of the invention is directed to a method comprising obtaining a precursor nanoparticle comprising a base material and a first ligand attached to the base material, and reacting the precursor nanoparticle with a reactant comprising a silicon bond (e.g., Si—X), thereby removing the first ligand. In some cases, the reactant comprises a second ligand and a silicon atom, and the second ligand replaces the first ligand on the base material.

Another embodiment of the invention is directed to a nanoparticle comprising: a base material and a ligand attached to the based material, wherein the ligand comprises at least one atom from columns V, VI and VII of the periodic table.

Another embodiment of the invention is directed to a method comprising: obtaining a precursor nanoparticle comprising a base material and a first ligand attached to the base material; and reacting the precursor nanoparticle with a reactant comprising a silicon bond, thereby removing the first ligand. The reactant comprises silicon and a second ligand comprising a halide. After reacting the base material and the reactant, the second ligand is attached to the base material instead of the first ligand.

Another embodiment of the invention is directed to a nanoparticle comprising: a base material; and a ligand attached to the based material, wherein the ligand comprises an atom from column VII of the periodic table.

These and other embodiments of the invention are described in further detail below.

Figure 1:
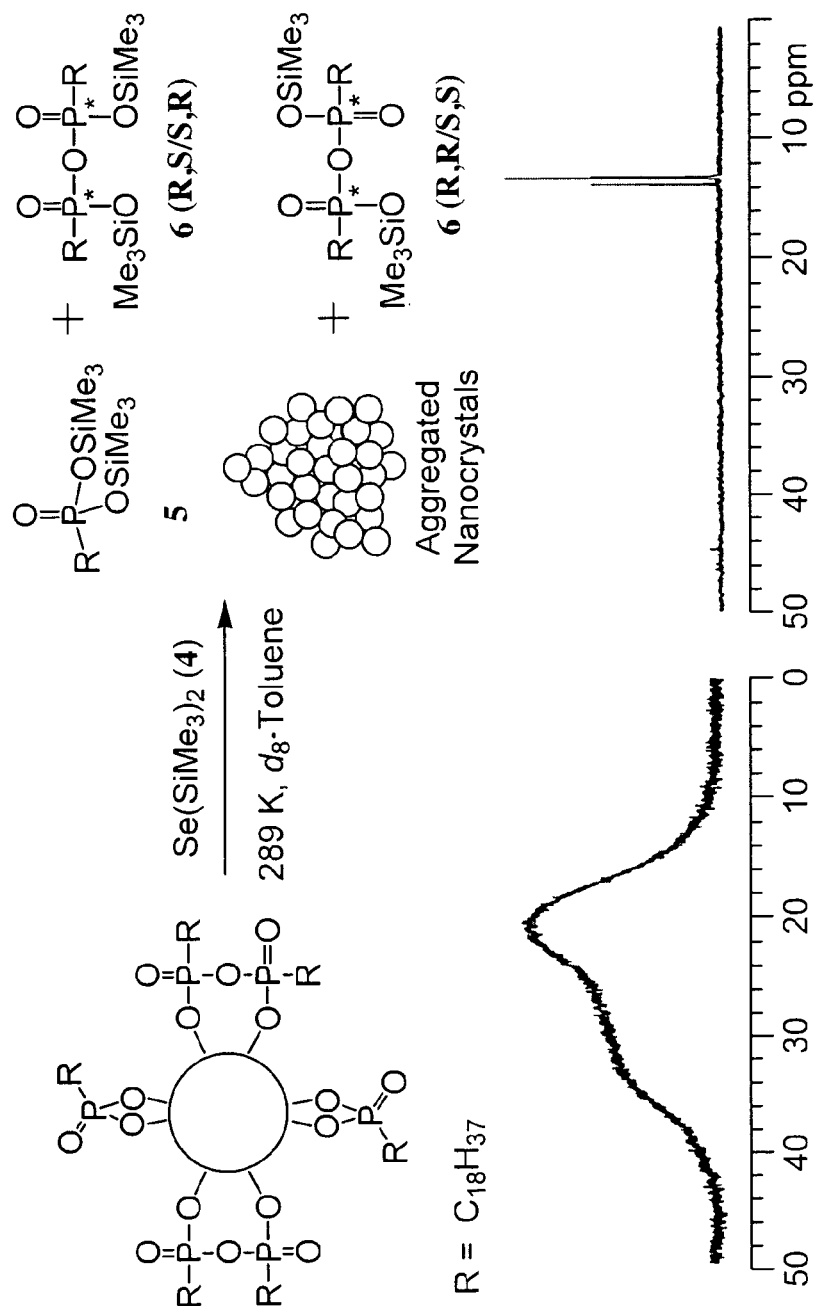
FIG. 1 shows $\{^1H\}^{31}P$ NMR spectra of 167 mg of as prepared CdSe nanocrystals in 0.6 ml $d_8$-toluene (left), and the reaction between CdSe nanocrystals and bis(trimethysilyl)selenide (4) in $d_8$-toluene.

The Figures are referenced below in the Detailed Description section of the present application.

DETAILED DESCRIPTION

Embodiments of the invention include nanoparticles and methods for making nanoparticles.

One embodiment of the invention comprises a method including obtaining a precursor nanoparticle comprising a base material and a first ligand (e.g., a phosphonate ligand) attached to the base material (e.g., CdSe). Suitable examples of first ligands may include phosphorous containing ligands (e.g., an alkyl phosphonate ligand or an alkylphosphinate ligand) or carboxylate containing ligands such as alkylcarboxylate ligands. Other examples may include carbamate, carbonate, alkoxide, phosphinate, sulphinate, and sulphonate containing ligands. In some embodiments, the first ligands may be any suitable ligands including an anionic group, which can be bonded to a cationic site on the surface of the precursor nanoparticle.

The method also includes reacting the precursor nanoparticle with a reactant comprising a silicon bond (e.g., Si—X), thereby removing at least the first ligand. The reaction of the precursor nanoparticle and the reactant comprising the silicon bond can occur in solution.

In embodiments of the invention, the reactant may comprise a silicon atom and a second ligand attached to the silicon atom. The second ligand may be X, which may comprise at least one atom selected from columns V, VI, and VII of the periodic table. For instance, X may be a halide such as Cl, Br, or I. In another example, X may be a sulphur containing ligand such as —SR, where R is a hydrocarbon chain, —S—SiMe$_3$, —S—(CH$_2$CH$_2$O)$_4$)CH$_3$, etc. X could alternatively be an Se containing ligand such as —SeSiMe$_3$. The second ligand may be attached to the base material of the precursor nanoparticle after the reaction, thereby replacing the first ligand and forming a processed nanoparticle (e.g. a nanoparticle comprising CdSe sphere with Cl ligands attached to the CdSe sphere).

The precursor nanoparticle may comprise any suitable composition or configuration and can be one or many precursor nanoparticles in solution. After the above-described reaction, the precursor nanoparticles may be processed to form processed nanoparticles. The processed nanoparticles may have the second ligand instead of the first ligand. For example, a first ligand such as a phosphorous containing group (e.g., an alkyl phosphonate ligand or an alkylphosphinate ligand) or a carbon containing group such as an alkylcarboxylate ligand, on a CdSe nanocrystal, may be replaced with a second ligand comprising Se, which extends the base material with another layer of Se.

As used herein, "nanoparticles" can refer to crystalline particles that have at least one dimension less than about 100 nanometers. In some embodiments of the invention, the nanoparticles may have two or more dimensions that are less than about 100 nanometers. The nanoparticles may be in the form of spheres, rods, tetrapods, branches, etc.

Nanoparticles may also include branched nanoparticles. Branched nanoparticles can have arms that have aspect ratios greater than about 1. In other embodiments, the arms can have aspect ratios greater than about 5, and in some cases, greater than about 10, etc. The widths of the arms may be less than about 200, 100, and even 50 nanometers in some embodiments.

The nanoparticles may comprise semiconductors such as compound semiconductors. Suitable compound semiconductors include Group II-VI semiconducting compounds such as ZnS, ZnSe, ZnTe, CdS, CdSe, CdTe, HgS, HgSe, and HgTe. Other suitable compound semiconductors include Group III-V semiconductors such as GaAs, GaP, GaAs—P, GaSb, InAs, InP, InSb, AlAs, AlP, and AlSb. The use of Group IV semiconductors such as germanium or silicon may also be feasible under certain conditions. Suitable methods for forming precursor nanoparticles can be found in U.S. Pat. Nos. 6,225,198 and 6,306,736.

Any of the foregoing materials may form a core material and/or a shell material, which surrounds a core material. The core material and/or the shell material may be part of a "base material." In embodiments of the invention, the base material is not altered during the reaction with the reactant containing the silicon bond. Rather, functional groups at the surface of the base material may react with the reactant containing the silicon bond.

Illustratively, the core material may comprise a CdSe sphere, and a shell material surrounding the CdSe sphere may be a ZnS shell. The CdSe/ZnS core/shell structure may form a base material. In other embodiments, the base material need not be in the form of a composite, but can be formed from a single unitary material such as CdSe.

After forming the nanoparticles, they may be further processed in any suitable manner. For example, if the nanoparticles comprising the base material are not substantially pure, then they may be purified using any suitable purification process known in the art.

As noted above, the reactant that is used can comprise any suitable material including a silicon bond. For example, the reactant can comprise a compound comprising a silicon bond. One atom of the silicon bond may be silicon, while the other atom may be at least one atom from columns V, VI, or VII of the periodic table. In some embodiments, the other atom is S, Se, Te, or a halide (e.g., Cl, or Br). Examples of suitable reactants include bis(trimethysilyl)selenide, S-trimethylsilyl-2,5,8,11-tetraoxatridecane-13-thiol, and Me$_3$Si—X (X=—S—SiMe$_3$, —Se—SiMe$_3$, —Cl and —S—(CH$_2$CH$_2$O)$_4$OCH$_3$)).

After the precursor nanoparticles are formed, they may be mixed in solution with the reactant. Any suitable solvent may be used as a liquid medium for mixing the precursor nanoparticles and the reactant. Suitable solvents include hydrocarbon solvents such as toluene, chloroform, hexane, diethylether, etc.

Mixing may also occur in any suitable manner. Conventional mixers and stirrers may be used to mix the reactant and the precursor nanoparticles.

The reaction may proceed at any suitable temperature and pressure sufficient to induce the removal of the first ligand from the precursor nanoparticles. Suitable temperatures can be equal to or higher than ambient temperature, but lower than the boiling point of the solvents used. For example, the reaction may proceed at about 298 K in some embodiments.

Other reagents such as surfactants may also be included in the reaction solution. Surfactants can help to keep the precursor nanoparticles and/or subsequently processed nanoparticles in solution. Examples include tetraalkylammonium halides, N,N'-dialklylimidazolium halides, alkylamines, alkylphosphines, alkylthiols, etc.

After mixing and reacting the precursor nanoparticles and the reactant, processed nanoparticles are formed. The processed nanoparticles may comprise the base material of the precursor nanoparticles. In some embodiments, the processed nanoparticles may include the base material with second ligands attached thereto. The second ligands may be ligands X, which were previously bonded to silicon atoms in the reactant comprising the silicon bond. The processed nanoparticles (and also the precursor nanoparticles) may have ligands that are only of one type (e.g., all Cl atoms), or may alternatively have mixtures of different ligands on them (e.g., a mixture of Cl and Br atoms in a monolayer on the base material each nanoparticle in a cluster of nanoparticles). In other embodiments, the processed nanoparticles may not have second ligands attached to the base material. In such embodiments, the first ligands in the precursor nanoparticles may simply be removed from the base material.

Advantageously, embodiments of the invention can use a reactant with a silicon containing bond. The use of this type of reactant is desirable, since the use of a silicon containing bond is thermodynamically favorable when removing a first ligand from a base material of a precursor nanoparticle.

Also, by using a silicon bond in the reactant, unique ligands such as ligands containing Se, Te, Cl, Br, etc. can be attached to a base material of a precursor nanoparticle. Ligands such as Cl, Br, and other halides are desirable, since they are small and can allow for nanoparticles containing such surface atoms to be packed closely together. This can be desirable, for example, in the electronics industry where the close packing of nanoparticles is desirable to provide for conduction in an electronic device. For example, the closely packed nanoparticles can be used as conductive lines in microcircuits, or solar devices such as solar cells. A microcircuit typically has a layer of insulating material with conductive lines formed on the insulating material. In other embodiments, nanoparticles that are closely packed together could be used to form an insulating layer in an electronic device. Also, such unique ligands can be used to induce subsequent reactions with the processed nanoparticles. For example, a nanoparticle with a chlorine monolayer at its surface may be further processed so that other ligands may replace the chlorine monolayer. Reactions may also be possible with a chlorine monolayer.

The formed nanoparticles according to embodiments of the invention can have unique optical, electrical, magnetic, catalytic, and mechanical properties, and can be used in a number of suitable end applications. They can be used, for example, as fillers in composite materials, as catalysts, as functional elements in optical devices, as functional elements in photovoltaic devices (e.g., solar cells), as functional elements in electrical devices, etc. They can also be used in LEDs, as biological labels, etc.

EXAMPLES

A number of examples are provided below. Embodiments of the invention are not limited to the description of such examples.

By using reagents with reactive silicon-chalcogen and silicon-chlorine bonds to cleave the ligands from the nanocrystal surface, it can be shown that as-prepared CdSe and CdSe/ZnS core-shell nanocrystal surfaces are likely terminated by X-type binding of alkylphosphonate ligands to a layer of $Cd^{2+}/Zn^{2+}$ ions, rather than by dative interactions. Further, spectroscopic evidence that tri-n-octylphosphine oxide (1) and tri-n-octylphosphine (2) are not coordinated to the purified nanocrystals is provided.

3-6 nm CdSe nanocrystals were synthesized by reacting tri-n-octylphosphine selenide with anhydrous cadmium-n-octadecylphosphonate prepared from dimethylcadmium and n-octadecylphosphonic acid (3) in tri-n-octylphosphine oxide (1) at 315° C. ZnS shells were grown on these cores by reacting zinc-n-octadecylphosphonate with bis(trimethylsilyl)sulfide under similar conditions. Both tri-n-octylphosphine oxide (1) and n-octadecylphosphonic acid (3) were recrystallized prior to use and shown to be free of phosphorus-containing impurities with NMR spectroscopy. To ensure the purity of the nanocrystal product, removal of remaining cadmium- and zinc-n-octadecylphosphonate, insoluble coordination polymers (Cao, G. et al., *Chem. Mater,* 5:1000-1006 (1993)), was accomplished by their depolymerization and dissolution with octylamine, followed by fractional precipitation of the nanocrystals.

$^1$H-NMR spectra of purified nanocrystals in $d_8$-toluene showed broad resonances for methylene groups ($\delta$=1.3-4.0 ppm) and methyl groups ($\delta$=0.9-1.0 ppm) in a ratio of ~17:1 representative of octadecyl chains. Additionally, a broad resonance of low intensity is visible between $\delta$=7.8-9.2 ppm, which was tentatively assigned to a low concentration of acidic hydrogens present in the ligand shell. (Assuming this resonance corresponds to the acidic hydrogen of an octadecylphosphonic acid ligand bound to the nanocrystal accounts for only one hydrogen per 11.5±2% of the octadecylphosphonate moieties.) A $\{^1H\}^{31}$P-NMR spectra of a concentrated sample (278 mg/mL) showed a broad bimodal resonance from $\delta$=10-40 ppm reminiscent of the spectrum published by Bawendi and coworkers, and originally interpreted to be characteristic of surface-bound tri-n-octylphosphine oxide (1) and tri-n-octylphosphine (2) (FIG. 1). Neither the $^1$H nor the $\{^1H\}^{31}$P-NMR spectrum showed sharp resonances that might arise from "free" surfactant molecules.

Removal of these surface-bound ligands was accomplished by adding bis(trimethysilyl)selenide (4) to a solution of the CdSe nanocrystals in $d_8$-toluene. Shortly after addition (10-60 minutes), the sample became turbid and the nanocrystals then slowly settled out of solution. NMR spectra of these solutions immediately after mixing are dramatically sharpened due to release of the surface-bound ligands (FIG. 1). In particular, three sharp resonances characteristic of "free" small molecules appeared in the $\{^1H\}^{31}$P-NMR spectrum that were assigned to O,O'-bis(trimethylsilyl)octadecylphosphonic acid (5) and a mixture of racemic and meso O,O'-bis(trimethylsilyl)octadecylphosphonic acid anhydride (6) (FIG. 1). Similar reactivity was observed with bis-trimethylsilylsulfide. Both mass spectrometry and an independent synthesis of these reaction byproducts confirmed the assignment.

The presence of the n-octadecylphosphonic acid anhydride in the ligand shell likely arises from reaction of n-octadecylphosphonic acid (3) with tri-n-octylphosphine selenide during the synthesis of CdSe, rather than as a byproduct of the ligand cleavage reaction. (Liu, H., et al. *J. Am. Chem. Soc.,* 129:305-312 (2007)). This is further supported by the observation that increasing amounts of meso O,O'-bis(trimethylsilyl)octadecylphosphonic acid anhydride (6) relative to O,O'-bis(trimethylsilyl)octadecylphosphonic acid (5) are cleaved from nanocrystals synthesized in reactions run to higher conversion of the cadmium and selenium nanocrystal precursors.

Figure 2:
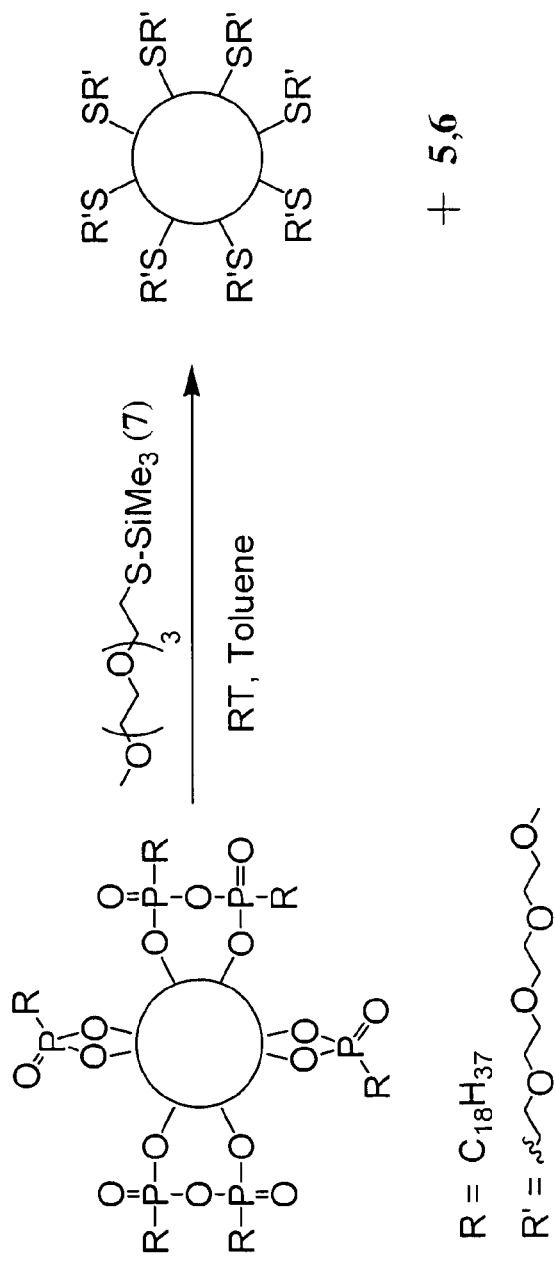
FIG. 2 shows the conversion of alkylphosphonate to thiolate ligands with TMS-protected thiol (7).

The reactivity of the silicon-selenium and silicon-sulfur bonds and the stability of the newly formed silicon-oxygen bond presumably provide the driving force for this reaction, and led the present inventors to attempt a similar ligand cleavage with a trimethylsilyl-protected thiol (7). In this case however, by reacting S-trimethylsilyl-2,5,8,11-tetraoxatridecane-13-thiol with the nanocrystals, a thiolate is exchanged for the phosphonates as shown in Scheme 2 in FIG. 2. Addition of S-trimethylsilyl-2,5,8,11-tetraoxatridecane-13-thiol (7) to a $d_8$-toluene solution of the CdSe nanocrystals resulted in rapid disappearance of the broad $^{31}$P-NMR resonance of the starting material and signals characteristic of O,O'-bis(trimethylsilyl)octadecylphosphonic acid (5) and a mixture of racemic and meso O,O'-bis(trimethylsilyl)octadecylphosphonic acid anhydride (6), as described above, but did not result in nanocrystal aggregation. The appearance of a broad resonance for the bound thiol in the $^1$H NMR spectrum was also evident ($\delta$=3.2-4.5 ppm). Removal of the solvent en vacuo and addition of anhydrous hexane resulted in partial dissolution of the nanoparticle product. Isolation of the solids by centrifugation and washing with anhydrous hexane produced nanocrystals that are soluble in polar solvents like water, methanol and chloroform was performed. A $^1$H NMR spectrum of the newly derivatized nanocrystals in $d_8$-toluene showed that 85% of the surface ligands are derived from S-trimethylsilyl-2,5,8,11-tetraoxatridecane-13-thiol (7) and 15% from octadecyl chains. (The relative integrals of the methylene and methyl resonances (1:17) from the remaining aliphatic chains showed that they are composed of octadecyl chains.) Analysis of the hexane-soluble portion with $^1$H and $\{^1H\}^{31}$P-NMR spectroscopy and ESI-TOF mass spectrometry showed the presence of 5-7 but no $^{31}$P NMR resonances for tri-n-octylphosphine oxide and tri-n-octylphosphine.

Figure 3:
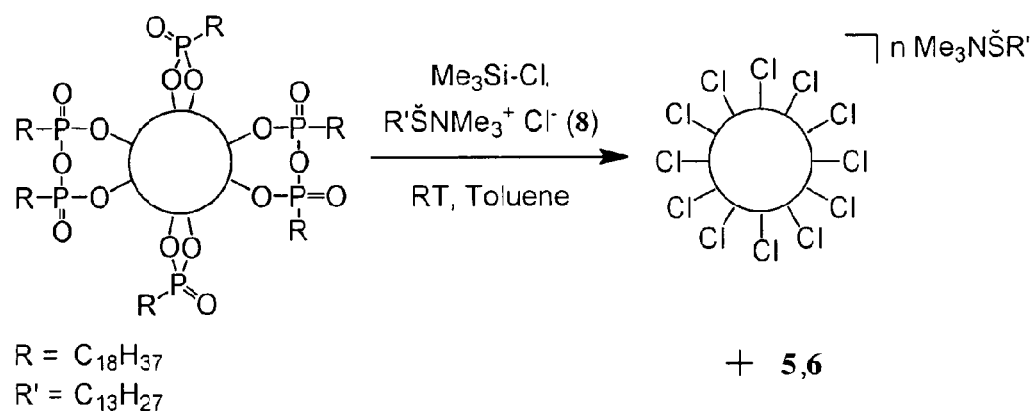
FIG. 3 shows chloride termination with $Me_3S$—Cl and anhydrous tridecyltrimethylammonium chloride (8).

The exchange the alkylphosphonate ligands for chloride ligands was also investigated. Adding anhydrous cholortrimethylsilane to a toluene solution of nanocrystals, results in rapid particle aggregation. Repeating this experiment in a mixture of toluene saturated with anhydrous tridecyltrimethylammonium chloride (8), however, prevented nanocrystal aggregation. (Adding anhydrous tridecyltrimethylammonium chloride (8) to the nanocrystals resulted in a ~5 nm shift of the fluorescence maximum.) Removal of excess anhydrous tridecyltrimethylammonium chloride (8) by centrifugation and subsequent fractional precipitation with hexane gave a nanocrystal solid that is soluble in toluene and chloroform. $\{^1H\}^{31}$P-NMR spectroscopy of the reaction byproducts in $d_8$-toluene showed the presence of O,O'-bis(trimethylsilyl)octadecylphosphonic acid (5) and a mixture of racemic and meso O,O'-bis(trimethylsilyl)octadecylphosphonic acid anhydride (6), while a $^1$H-NMR spectrum of the nanocrystals showed resonances characteristic of the tridecyltrimethylammonium ion (FIG. 3). Repeating this experiment with CdSe/ZnS core-shell particles resulted in a 25% decrease in the fluorescence quantum yield. (All reactions of chlorotrimethylsilane with nanoparticles were conducted with two equivalents relative to the number octadecylshains in the sample as determined by $^1$H-NMR spectroscopy. Addition of excess chlorotrimethylsilane results in etching of the CdSe particles, as evidenced by a blue-shifting of their absorption and fluorescence spectra, as well as a decrease in quantum yield of the CdSe/ZnS core-shell samples.). Referring to FIG. 3, the number of chloride ligands on the particle surface is equal to the number of phoshphonate linkages transformed to chloride ligands, plus the number of adsorbed chlorides anions from anhydrous tridecyltrimethylammonium chloride (8), denoted n in FIG. 3.

Figure 4:
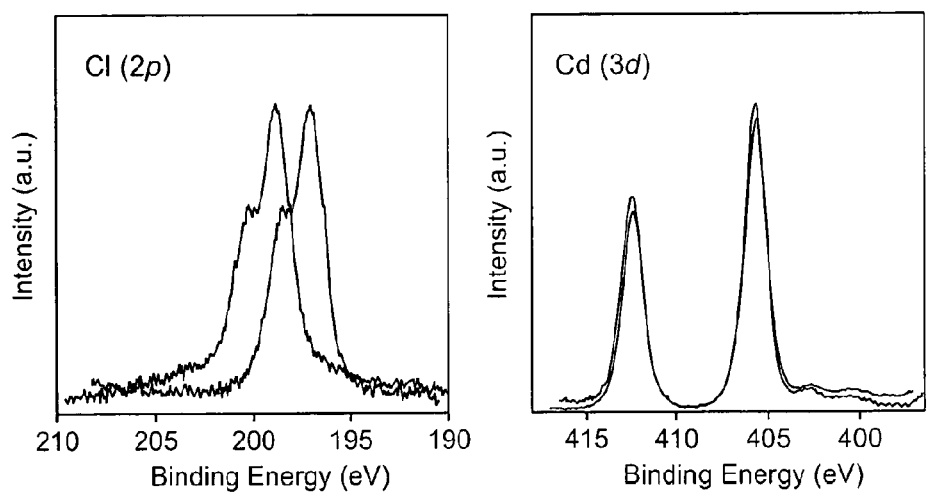
FIG. 4 shows XPS plots of chloride-terminated CdSe nanocrystals (-) (see FIG. 3), anhydrous tridecyltrimethylammonium chloride (8) (-), and underivatized nanocrystals (-). Au 4f binding energies of the substrate were used as an internal reference.

XPS analysis of the Cl-functionalized nanoparticles made soluble with anhydrous tridecyltrimethylammonium chloride (8) was performed to demonstrate binding of chloride to the nanoparticle surface. Binding energies of Cl 2p electrons are sensitive to their coordination environment with reported values for tetraalkylammonium chloride salts of 196 eV, while CdCl$_2$ shows Cl binding energies of 199 eV. (Seals, R. D. et al., Inorg. Chem., 12:2485-2487 (1973); Escard, J. et al., Inorg. Chem., 13:695-701 (1974)). XPS analysis of the chloride-terminated nanocrystals dropcast on a gold substrate showed Cl binding energies of 199 eV with no contribution below 198 eV, ruling out the presence of significant amounts of "free" anhydrous tridecyltrimethylammonium chloride (8) (FIG. 4).

The facile ligand cleavage and exchange reactivity of the trimethylsilylchalcogenides and chlorotrimethylsilane presented above suggests that the nanocrystal surfaces may be terminated by X-type binding of anionic alkylphosphonate moieties to Cd$^{2+}$ ions on the crystal surface. This hypothesis is best supported by a model where a layer of excess cadmium ions bind to the Lewis basic selenide surface sites of the CdSe core and are charge balanced by the phosphonate ligand. Previously reported Rutherford backscattering experiments also concluded that CdSe nanocrystals contain excess Cd ions on their surfaces. (Taylor, J. et al., J. Clust. Sci., 12:571-582 (2001)). This conclusion, however, does not strictly follow from these ligand cleavage experiments, since a control experiment showed free phosphonic acid (3) and its anhydride also produce O,O'-bis(trimethylsilyl)octadecylphosphonic acid (5) and a mixture of racemic and meso O,O'-bis(trimethylsilyl)octadecylphosphonic acid anhydride (6), respectively, on reaction with bis(trimethysilyl)selenide (4).

To further investigate the nature of the binding between n-octadecylphosphonic acid (3) and the nanocrystal surface, the direct reaction of our CdSe nanocrystals with thiols was studied. Addition of 2-methoxyethanethiol (9) or its long chain counterpart 2,5,8,11-tetraoxatridecane-13-thiol (10) to the CdSe nanocrystal sample resulted in minimal changes to the resonances for the surface-bound octadecyl chains in the $^1$H NMR, though a broad resonance ($\delta$=3.2-4.5 ppm) appeared upfield of the free thiol. (A small concentration (<10%) of free surfactant ligands appeared upon the addition of O,O'-bis(trimethylsilyl)octadecylphosphonic acid (5), that rapidly reached equilibrium. Surprisingly, heating this sample to 100° C. for 16 hours made little difference to these spectra.) Repeated precipitation of these nanoparticles from toluene by addition of hexane furnished a nanoparticle product that retained the broad signatures of the bound thiol ($\delta$=3.2-4.5 ppm) as well as the starting octadecylphosphonate ligands in an approximate 1:1 ratio. No sharp lines indicative of "free" surfactant molecules were visible. Additionally, the nanocrystal fluorescence was immediately quenched upon addition of 2-methoxyethanethiol (9) or its long chain counterpart 2,5,8,11-tetraoxatridecane-13-thiol (10). Both observations indicating that the thiol binds the nanocrystal surface. Repeating this experiment in the presence of added triethylamine, however, resulted in rapid (t<10 minutes) sharpening of the aliphatic resonances in the $^1$H-NMR spectrum. At the same time two sharp resonances in the $^{31}$P-NMR spectrum ($\delta$=16.6, 26.1 ppm) appeared that can be assigned to the conjugate base of octadecylphosphonic acid and octadecylphosphonic acid anhydride. (The important resonance structures of the dianionic form of octadecylphosphonic acid anhydride show that this molecule, unlike the mixture of racemic and meso O,O'-bis(trimethylsilyl)octadecylphosphonic acid anhydride (6), is not chiral. Similarly, its protonated form shows a single line spectrum as a result of rapid hydrogen ion exchange between the P—OH and P=O functionalities.

The inability of 2,5,8,11-tetraoxatridecane-13-thiol (10) to displace the alkylphosphonate ligands in the absence of added base best supports the conclusion that alkylphosphonate moieties are bound to cationic cadmium sites as an anion, rather than by a simple dative interaction. Accordingly, the thiol converts the alkylphosphonate ligand to an equivalent of free phosphonic acid in order to displace it from the nanocrystal and form a Cd$^{2+}$-thiolate interaction. The lack of this reactivity is likely to arise from a greater pKa of the thiolate ligand, which remains preferentially protonated over the alkylphosphonate oxygen. These results indicate that surface exchange reactions ought to be designed with the need to balance charges between the surface Cd$^{2+}$ layer and the incoming ligand.

This picture of a CdSe nanocrystal surface is particularly interesting in light of recent single crystal X-ray structures of monolayer-protected Au clusters. (Jadzinslcy, P. D. Science, 318:430-433 (2007); Whetten, R. L., Price, R. C., Science, 318:407-408 (2007); Heavan, M. W. et al., J. Am. Chem. Soc., 130:3754-3755 (2008); Akola, J. et al., J. Am. Chem. Soc., 130:3756-3757 (2008)). Those results complement the present inventors' model in the sense that the Au cluster can be described as a closed shell Au core with a surface layer of Au(I)-thiolate. In the present inventors' model, the nanocrystal is composed of a CdSe core with a surface layer of Cd-octadecylphosphonate. A similar structural motif has been observed in the X-ray structures of cadmium-thiolate terminated cadmium-chalcogenide clusters. (Dance, I. G. et al, *J. Am. Chem. Soc.*, 106:6285 (1984); Lee, G. et al., *J. Am. Chem. Soc.*, 110:4863-4864 (1988) and references therein.) The ligand shell in all these clusters is composed of X-type interactions rather than simple dative interactions.

Further, that free thiols adsorb to our nanocrystal surfaces without displacing the octadecylphosphonate ligands, and that chloride-terminated nanocrystals can be made soluble by the addition of long-chain tetraalkylammonium chloride salts, supports the idea that there are Lewis-acidic coordination sites in addition to those occupied by the X-type phosphonate ligands. Integration of our $^1$H NMR spectra indicates there are an approximately equal number of L- and X-type sites available for ligand binding. The presence of these Lewis-acidic coordination sites may explain the numerous reports that the addition of dative ligands can change the solubility and optical properties of cadmium selenide nanocrystals. (See Kalyuzhny, G., Murray, R. W., *J. Phys. Chem. B*, 109:7012-7021 (2005) and references cited within.)

These results shed new light on the chemistry and reactivity of CdSe nanocrystal surfaces. Preliminary studies suggest similar chemical reactivity of other II-VI semiconductor nanocrystals. The conclusion that alkylphosphonate ligands are bound via X-type interaction with $Cd^{2+}$ can not only influence the development of more powerful ligand exchange reactions, but will allow for more sophisticated understanding of how ligands and surfaces control the optical and electrical properties of nanocrystals. Furthermore, the ability to convert the alkylphosphonate ligands to other X-type ligands, like chloride, will undoubtedly have a significant impact on the electrical properties of these nanocrystals.

Figure 5:
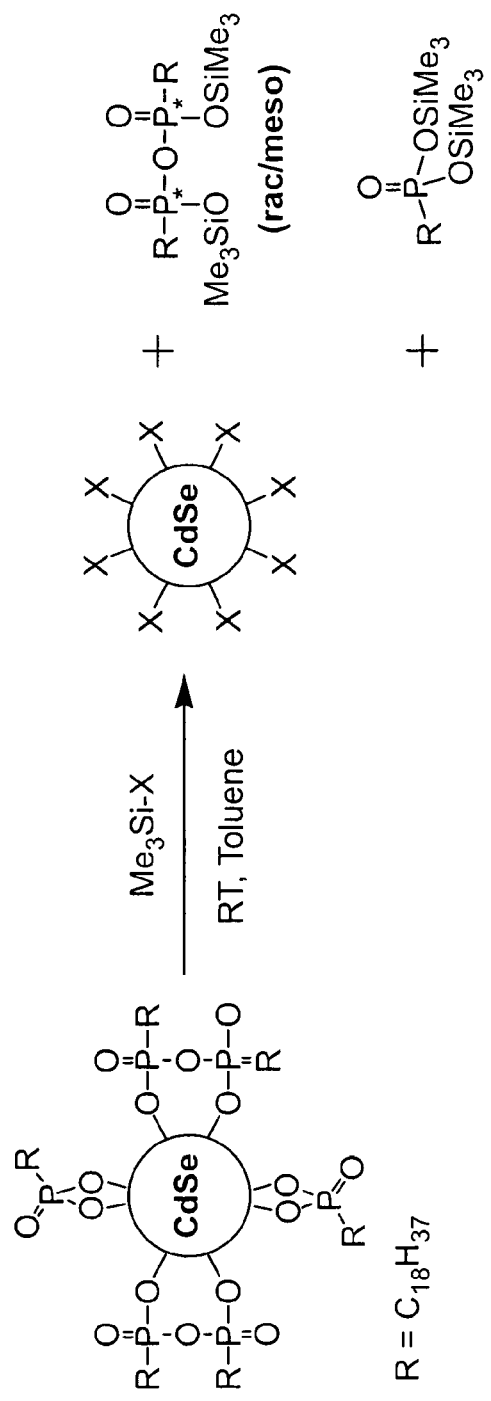
FIG. 5 shows another reaction scheme involving $Me_3Si$—X.

In yet another example, referring to FIG. 5, the surface chemistry of cadmium selenide nanocrystals, prepared from tri-n-octylphosphine selenide and cadmium octadecylphosphonate in tri-n-octylphosphine oxide, was studied with $^1$H and $\{^1H\}^{31}P$ NMR spectroscopy as well as ESI-MS and XPS. The identity of the surface ligands was inferred from reaction of nanocrystals with $Me_3Si$—X(X=—S—$SiMe_3$, —Se—$SiMe_3$, —Cl and —S—$(CH_2CH_2O)_4OCH_3$)) and unambiguous assignment of the organic byproducts, O,O'-bis-trimethylsilyloctadecylphosphonic acid ester and O,O'-bis-trimethylsilylocatdecylphosphonic acid anhydride ester. Nanocrystals isolated from these reactions have undergone exchange of the octadecylphosphonate ligands for —X as was shown by $^1$H NMR (X=—S—$(CH_2CH_2O)_4OCH_3$) and XPS (X=—Cl). Addition of free thiols to as prepared nanocrystals results in binding of the thiol to the particle surface and quenching of the nanocrystal fluorescence. Isolation of the thiol-ligated nanocrystals shows this chemisorption proceeds without displacement of the octadecylphosphonate ligands suggesting the presence of unoccupied Lewis-acid sites on the particle surface. In the presence of added triethylamine, however, the octadecylphosphonate ligands are readily displaced from the particle surface as was shown with $^1$H and $\{^1H\}^{31}P$ NMR. These results, in conjunction with previous literature reports, indicate that as prepared nanocrystal surfaces are terminated by X-type binding of octadecylphosphonate moieties to a layer of excess cadmium ions.

Although the foregoing invention has been described in some detail by way of illustration and example for purposes of clarity of understanding, one of skill in the art will appreciate that certain changes and modifications may be practiced within the scope of the appended claims.

Various features from the various embodiments may be combined in any suitable manner without departing from the scope of the invention.

Any reference to "a," "an," or "the," is intended to mean "one or more" unless specifically indicated to the contrary.

All references, patent applications, and patents noted above are herein incorporated by reference in their entirety for all purposes. None of the references, patent applications, or descriptions disclosed herein is admitted to be prior art.

What is claimed is:

1. A method comprising:
    obtaining a precursor nanoparticle comprising a base material and a first ligand attached to the base material; and
    reacting the precursor nanoparticle with a reactant comprising:
        a silicon bond of Si—X, wherein X comprises at least one atom selected from the group consisting of S, Se, and halide; and
        a second ligand,
    thereby removing the first ligand,
    wherein after reacting, the second ligand is attached to the base material instead of the first ligand.

2. The method of claim 1 wherein the base material comprises a core material and a shell material surrounding the core material.

3. The method of claim 1 wherein the first ligand comprises an alkylphosphonate ligand, an alkylphosphinate ligand, or an alkylcarboxylate ligand.

4. The method of claim 1 wherein reacting the nanoparticle with the reactant comprising the silicon bond is performed in solution.

5. A nanoparticle comprising:
    a base material; and
    a ligand attached to the base material,
    wherein the nanoparticle is formed by the method of claim 1.

6. An electronic device comprising the nanoparticle of claim 5.

7. The nanoparticle of claim 5 wherein the ligand comprises an atom selected from at least columns VI and VII of the periodic table.

8. The nanoparticle of claim 7 wherein the base material comprises a core material and a shell material.

9. The nanoparticle of claim 7 wherein the base material comprises only a core material, wherein the core material comprises a compound semiconductor.

10. The nanoparticle of claim 7 wherein the base material comprises CdSe.

11. An electronic device comprising the nanoparticle of claim 7.

12. A method comprising:
    obtaining a precursor nanoparticle comprising a base material and a first ligand attached to the base material; and
    reacting the precursor nanoparticle with a reactant comprising a silicon bond, thereby removing the first ligand,
    wherein the reactant comprises silicon and a second ligand, and wherein after reacting, the second ligand is attached to the base material instead of the first ligand, and wherein the second ligand includes a halide.

13. The method of claim 12 wherein the base material comprises a core material and a shell material surrounding the core material.

14. The method of claim 12 wherein the first ligand comprises an alkylphosphonate ligand, an alkylphosphinate ligand, or an alkylcarboxylate ligand.

15. The method of claim 12 wherein the reactant comprising silicon is a compound comprising silicon, wherein the compound comprising silicon comprises Si—X, wherein X comprises at least one atom selected from the group consisting of S, Se, and halides.

16. The method of claim 12 wherein reacting the nanoparticle with the reactant comprising silicon is performed in solution.

17. A nanoparticle formed by the method of claim 12.

18. An electronic device comprising the nanoparticle of claim 17.

19. The nanoparticle of claim 7
   wherein the ligand comprises an atom from column VII of the periodic table.

20. The nanoparticle of claim 19 wherein the base material comprises a core material and a shell material.

21. The nanoparticle of claim 19 wherein the base material comprises only a core material, wherein the core material comprises a compound semiconductor.

22. The nanoparticle of claim 19 wherein the base material comprises CdSe.

23. An electronic device comprising the nanoparticle of claim 19.

* * * * *